United States Patent [19]
McClelland, Jr.

[11] 3,760,244
[45] Sept. 18, 1973

[54] CERAMIC CAPACITOR AND METHOD OF FORMING SAME

[75] Inventor: Roland Hill McClelland, Jr., San Diego, Calif.

[73] Assignee: Illinois Tool Works Inc., Chicago, Ill.

[22] Filed: Aug. 31, 1972

[21] Appl. No.: 285,160

[52] U.S. Cl................ 317/258, 29/25.42, 252/63.2
[51] Int. Cl.............................................. H01g 1/01
[58] Field of Search......................... 106/49, 39 R; 252/63.2; 317/258, 261; 29/25.42

[56] References Cited
UNITED STATES PATENTS
3,609,483  9/1971  Smyly ............................. 317/268
3,619,220  11/1971  Maher .................................. 106/49
3,682,766  8/1972  Maher ............................. 106/39 R Primary Examiner—E. A. Goldberg
Attorney—Roy H. Olson et al.

[57] ABSTRACT

A ceramic capacitor is disclosed herein having ceramic layers formed of a composition of lead oxide, aluminum oxide, silicon oxide, barium oxide, and calcium oxide. Deposited on the ceramic layers are silver electrodes and the entire ceramic capacitor including the electrodes are fired at a temperature below 961°C which is below the melting temperature of the silver electrodes.

23 Claims, 3 Drawing Figures

PATENTED SEP 18 1973          3,760,244

CERAMIC CAPACITOR AND METHOD OF FORMING SAME

BACKGROUND OF THE INVENTION

This invention relates generally to ceramic capacitor structures and a method of forming the same. More specifically, the invention discloses a composition of materials which have maximum ceramic properties for use as a dielectric in multilayer capacitors and wherein the firing temperature necessary to mature the ceramic material and produce a monolithic structure is below the melting temperature of relatively inexpensive electrodes formed thereon.

In the manufacture of monolithic multilayer ceramic capacitors, it is necessary to fire the body at a relatively high firing temperature, in the order of 1200°C to 1285°C, to maximize the physical properties of the ceramic material being used and provide a mechanical matrix for the electrodes being encased. However, when firing ceramic materials at this elevated temperature, conductive electrodes of relatively inexpensive material, such as silver, cannot be used because such electrodes would melt and become discontinuous.

Furthermore, it is desirable to form ceramic capacitor bodies characterized by low losses and stability similar to that of mica but with a more linear temperature coefficient and improved reliability. Also ceramic bodies forming such capacitors are required to have low and high temperature reliability as well as being capable of reliable operation at low voltage.

Accordingly, it is an object of this invention to provide a new and improved composition of materials to form ceramic bodies having the capability of being fired at relatively low temperatures so that relatively inexpensive electrode material can be used to form a multilayer monolithic capacitor.

Another object of this invention is to provide a new and improved composition of ceramic material which has electrical properties similar to mica but with more linearity of temperature coefficient, and improved low voltage operation.

Another object of this invention is to provide a composition of materials forming a ceramic body which allows such ceramic bodies to be precisely dimensioned during the manufacture threof in the green or raw state of ceramic so that after firing the dimensions are stable.

Yet another object of this invention is to provide a method of forming a ceramic capacitor which allows the co-firing of the ceramic with the electrodes deposited thereon at a relatively low temperature.

Briefly, the method of forming ceramic capacitors of this invention includes the steps of forming a ceramic body of a mixture of materials including lead oxide, aluminum oxide, silicon oxide, barium oxide and calcium oxide of various amounts to be described and in some instances including materials such as barium tinanate, titanium oxide or calcium titanate, as well as a composition of $CaZrO_3$. After a ceramic body is formed silver electrodes are deposited thereon while the ceramic is still in the green state. Multiple layers of the ceramic with electrodes thereon are stacked and pressed together and the entire capacitor structure including the electrodes are fired at a temperature below 961°C which is the melting temperature of the silver electrodes.

Accordingly, many other objects, features and advantages of this invention will be more fully realized and understood from the following detailed description when taken in conjunction with the accompanying drawings wherein like reference numerals throughout the various views of the drawings are intended to designate similar elements or components.

DETAILED DESCRIPTION OF THE ILLUSTRATED EMBODIMENTS

Figure 1:
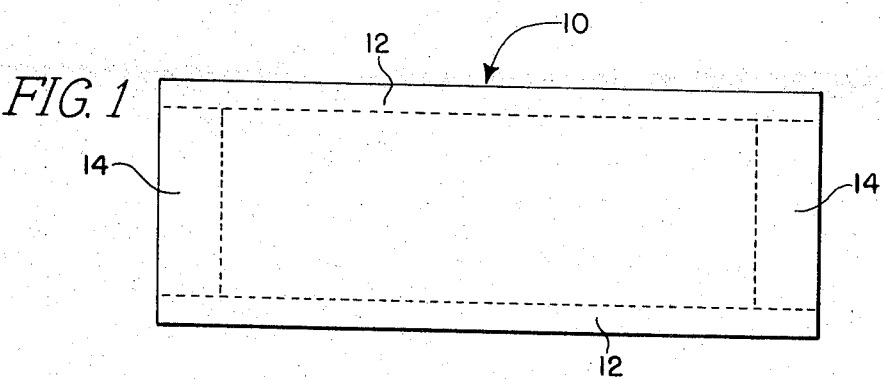
FIG. 1 is a top plane view of a multilayer capacitor design constructed in accordance with the method of this invention.
Figure 2:
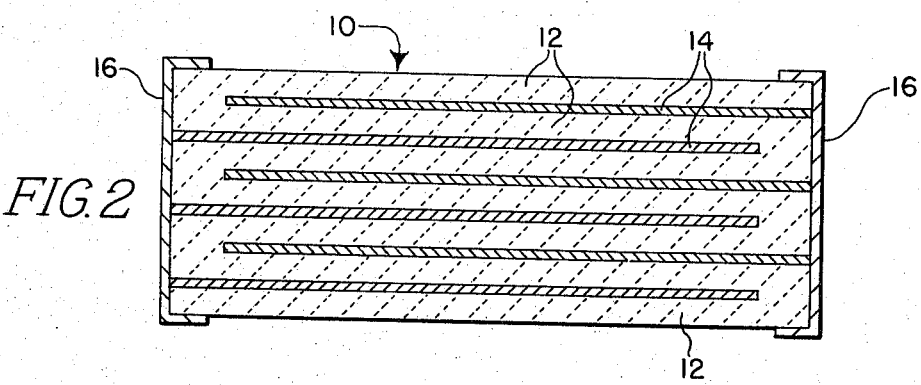
FIG. 2 is a sectional view of the capacitor configuration illustrated in FIG. 1.

Referring now to FIGS. 1 and 2, a multilayer ceramic capacitor constructed in accordance with the principles of this invention is designated generally by the reference numeral 10 and includes a plurality of alternate dielectric and electrode layers 12 and 14 which are bonded or laminated to each other. Preferably, the electrodes are silver and are deposited by silk screening or vapor deposition or the like.

The electrode layers are laterally offset from one another and extend to opposite edges of the capacitor body 10 to permit an electrical connection to be made thereto. Conventionally, a conductive coating 16 is applied to the capacitor body 10 to electrically connect the exposed edges of the electrode layers on opposite sides of the capacitor.

The ceramic layers are formed of a mixture of materials which allow the body to be fired to a monolithic ceramic structure at a temperature below the melting point of the electrodes. Most advantageously, this is below 961°C which is the melting temperature of silver.

Figure 3:
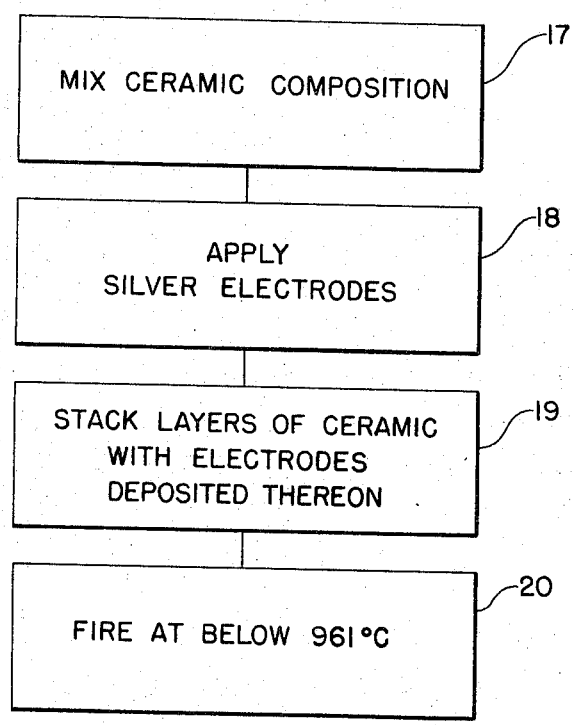
FIG. 3 is illustrative of the various steps of a method of this invention.

The method of this invention is illustrated in FIG. 3 which shows four basic steps to the formation of the ceramic capacitor. Here a mixing stage 17 is shown wherein the ceramic composition is formed of the desired constituents. After the appropriate quantities of the particular materials being used and formed into a ceramic paste and semi-cured to remove solvent and obtain a green state, silver electrodes are applied thereto as indicated by the step 18. The ceramic layers with electrode material deposited thereon are then stacked, as indicated by the step 19, pressed and cut to form the multilayer structures, each having a plurality of alternating electrode and dielectric layers. The entire structure is then fired at a temperature below 961°C as indicated by step 20, to completely mature the ceramic and encase all but the terminal edges of alternating layers of electrodes within the ceramic structure.

The ceramic compositions used in this invention are generally capable of maturing at a temperature in the range of 891°C – 910°C which allows the use of electrode materials, such as silver, as opposed to relatively expensive materials, such as platinum.

To obtain a ceramic material having the desired properties the combination of elements utilized are as follows: lead oxide in an amount of about from 15 to 40 percent by weight; aluminum oxide in an amount of about from 0.3 to 2 percent by weight; silicon oxide in an amount of about from 10 to 60 percent by weight; barium oxide in an amount of about from 1 to 5 percent by weight; calcium oxide in an amount of about from 2 to 20 percent by weight.

To change specific properties of the ceramic material, other constituents can be added thereto. For example, to obtain ceramic material having different temperature coefficients, materials such as barium titanate in an amount of about from 0 to 13 percent by weight can be added; titanium oxide in an amount of about from 0 to 36 percent by weight can be added; calcium titanate in an amount of about from 0 to 15 percent by weight can be added; and a composition of $CaZrO_3$ can be added in an amount of about from 0 to 15 percent by weight.

While a plurality of different combinations of the above-defined elements can be incorporated, a list of specific examples is given herein. While the second example is intended to be the preferred composition of ceramic material utilized herein, it is not to be interpreted in a limiting sense.

EXAMPLE 1

| | % by weight |
|---|---|
| lead oxide (PbO) | 37.8 |
| aluminum oxide ($Al_2O_3$) | 1.4 |
| silicon oxide ($SiO_2$) | 41.8 |
| barium oxide (BaO) | 4.5 |
| calcium oxide (CaO) | 14.5 |

EXAMPLE 2

| | |
|---|---|
| lead oxide (PbO) | 32.4 |
| aluminum oxide ($Al_2O_3$) | 1.2 |
| silicon oxide ($SiO_2$) | 43.2 |
| barium oxide (BaO) | 3.9 |
| calcium oxide (CaO) | 19.3 |

EXAMPLE 3

| | |
|---|---|
| lead oxide (PbO) | 24.3 |
| aluminum oxide ($Al_2O_3$) | 1.0 |
| silicon oxide ($SiO_2$) | 45.3 |
| barium oxide (BaO) | 2.9 |
| calcium oxide (CaO) | 26.5 |

EXAMPLE 4

| | |
|---|---|
| lead oxide (PbO) | 32.4 |
| aluminum oxide ($Al_2O_3$) | 1.2 |
| silicon oxide ($SiO_2$) | 32.8 |
| barium oxide (BaO) | 3.9 |
| calcium oxide (CaO) | 9.7 |
| titanium oxide ($TiO_2$) | 20.0 |

EXAMPLE 5

| | |
|---|---|
| lead oxide (PbO) | 32.4 |
| aluminum oxide ($Al_2O_3$) | 1.2 |
| silicon oxide ($SiO_2$) | 37.0 |
| barium oxide (BaO) | 3.9 |
| calcium oxide (CaO) | 13.5 |
| calcium titanate ($CaTiO_3$) | 12.0 |

EXAMPLE 6

| | |
|---|---|
| lead oxide (PbO) | 32.4 |
| aluminum oxide ($Al_2O_3$) | 1.2 |
| silicon oxide ($SiO_2$) | 37.3 |
| barium oxide (BaO) | 3.9 |
| calcium oxide (CaO) | 13.8 |
| barium titanate ($BaTiO_3$) | 6.8 |
| $CaZrO_3$ | 4.6 |

EXAMPLE 7

| | |
|---|---|
| lead oxide (PbO) | 32.4 |
| silicon oxide ($SiO_2$) | 37.0 |
| aluminum oxide ($Al_2O_3$) | 1.2 |
| barium oxide (BaO) | 3.9 |
| calcium oxide (CaO) | 13.5 |
| $SrTiO_3$ | 12.0 |

EXAMPLE 8

| | |
|---|---|
| lead oxide (PbO) | 32.4 |
| silicon oxide ($SiO_2$) | 32.8 |
| aluminum oxide ($Al_2O_3$) | 1.2 |
| barium oxide (BaO) | 3.9 |
| calcium oxide (CaO) | 9.7 |
| $SrTiO_3$ | 20.0 |

The following Table I exemplifies the electrical characteristics of capacitors constructed according to the teachings of this invention and also, for comparison purposes, lists the electrical characteristics of a comparable mica capacitor.

TABLE I

| | K (dielectric constant) | DF (% disipation factor) | TCC (temperature coefficient) |
|---|---|---|---|
| Example 2 | 6.5 | 0.05 | P130 |
| Example 4 | 14.7 | 0.08 | P 94 |
| Example 5 | 9.2 | 0.05 | P100 |
| Example 6 | 7.1 | 0.08 | P 99 |
| Example 7 | 7.9 | 0.09 | 0 |
| Example 8 | 9.5 | 0.1 | N150 |
| Mica | 5.4–7.3 | 0.01–0.1 | Variable |

As shown above, the monolithic capacitors constructed in accordance with this invention have electrical characteristics which are comparable to mica capacitors but which have the advantage of better controllability and selectivity of a range of electrical characteristics.

If desired, the dielectric compositions may be mixed as subcompositions, for example the appropriate amounts of $SiO_2$ and CaO may be added as wollastonite ($CaSiO_3$) to the remaining ingredients of the compositions.

While only eight specific examples have been illustrated herein, it will be understood that other variations and modifications may be effected without departing from the spirit and scope of the novel concepts disclosed and claimed herein.

The invention is claimed as follows:

1. A low-loss ceramic capacitor comprising in combination: a dielectric ceramic body which matures at a firing temperature less than 961°C including, lead oxide in an amount of about from 15 to 40 percent by weight, aluminum oxide in an amount of about from 0.3 to 2 percent by weight, silicon oxide in an amount of about from 10 to 60 percent by weight, barium oxide in an amount of from about 1 to 5 percent by weight, calcium oxide in an amount of about from 2 to 20 percent by weight, and electrode material having a melting temperature generally less than 961°C formed on said ceramic body prior to firing the body.

2. A monolithic ceramic capacitor in accordance with claim 1, which includes a plurality of layers of said ceramic body with said electrode material deposited thereon, alternate electrode layers being offset from one another to extend to opposite edges of the monolithic body.

3. A ceramic capacitor according to claim 1, wherein said electrode material is silver.

4. The ceramic capacitor according to claim 1, wherein said lead oxide is in an amount of 32.4 percent by weight, said aluminum oxide is in an amount of 1.2 percent by weight, said silicon oxide is in an amount of 43.2 percent by weight, said barium oxide is in an amount of 3.9 percent by weight, and said calcium oxide is in an amount of 19.3 percent by weight.

5. The ceramic capacitor according to claim 1, further including barium titanate in an amount of about from 0 to 13 percent by weight.

6. The ceramic capacitor according to claim 5, wherein said barium titanate is in an amount of 6.8 percent by weight.

7. The ceramic capacitor according to claim 1, further including titanium oxide in an amount of about from 0 to 36 percent by weight.

8. The ceramic capacitor according to claim 7, wherein said titanium oxide is in an amount of 20 percent by weight.

9. The ceramic capacitor according to claim 1, further including calcium titanate in an amount of about 0 to 15 percent by weight.

10. The ceramic capacitor according to claim 9, wherein said calcium titanate is in an amount of 12 percent by weight.

11. The ceramic capacitor according to claim 1, further including $SrTiO_3$ in an amount of about 0 to 25 percent by weight.

12. The ceramic capacitor according to claim 11, wherein said $SrTiO_3$ is in an amount of 12 percent by weight.

13. The ceramic capacitor according to claim 11, wherein said $SrTiO_3$ is in an amount of 20 percent by weight.

14. A method of forming a low-loss monolithic multilayer ceramic capacitor comprising the steps of: forming a green ceramic body of a mixture of materials including lead oxide in an amount of about from 15 to 40 percent by weight, aluminum oxide in an amount of about from 0.3 to 2 percent by weight, silicon oxide in an amount of about from 10 to 60 percent by weight, barium oxide in an amount of about from 1 to 5 percent by weight, calcium oxide in an amount of about from 2% to 20% by weight, applying silver electrodes to said green ceramic body, stacking a plurality of said ceramic bodies and firing said ceramic bodies and said silver electrodes at a temperature below the melting point of said silver electrodes.

15. A method of forming a ceramic capacitor according to claim 14, wherein said firing is conducted at a temperature of from about 891°C to 961°C.

16. The method of forming a ceramic capacitor according to claim 14, wherein said lead oxide is in an amount of 32.4 percent by weight, said aluminum oxide is in an amount of 1.2 percent by weight, said silicon oxide is in an amount of 43.2 percent by weight, said barium oxide is in an amount of 3.9 percent by weight, and said calcium oxide is in an amount of 19.3 percent by weight.

17. The method of forming a ceramic capacitor according to claim 14, further including the step of adding barium titanate in an amount of about from 0 to 13 percent by weight.

18. The method of forming a ceramic capacitor according to claim 14, further including the step of adding titanium oxide in an amount of about from 0 to 36 percent by weight.

19. The method of forming a ceramic capacitor according to claim 14, further including the step of adding calcium titanate in an amount of about from 0 to 15 percent by weight.

20. The method of forming a ceramic capacitor according to claim 14, further including adding a composition of $CaZrO_3$ in an amount of about from 0 to 6 percent by weight.

21. The method of forming a ceramic capacitor according to claim 14, further including adding a composition of $SrTiO_3$ in an amount of about from 0 to 25 percent.

22. The method of forming a ceramic capacitor according to claim 21, wherein said $SrTiO_3$ is in an amount of 12 percent by weight.

23. The method of forming a ceramic capacitor according to claim 21, wherein said $SrTiO_3$ is in an amount of 20 percent by weight.

* * * * *